(12) United States Patent
Broom

(10) Patent No.: US 6,736,226 B2
(45) Date of Patent: May 18, 2004

(54) METHOD AND APPARATUS FOR BORING THROUGH A SOLID MATERIAL

(75) Inventor: Gilbert R. Broom, DeMotte, IN (US)

(73) Assignee: Cutting Edge Technologies, LLC, Remington, IN (US)

( * ) Notice: Subject to any disclaimer, the term of this patent is extended or adjusted under 35 U.S.C. 154(b) by 0 days.

(21) Appl. No.: 10/133,594

(22) Filed: Apr. 26, 2002

(65) Prior Publication Data

US 2002/0121392 A1 Sep. 5, 2002

Related U.S. Application Data

(63) Continuation-in-part of application No. 09/601,560, filed as application No. PCT/US99/02202 on Feb. 2, 1999, which is a continuation-in-part of application No. 09/018,244, filed on Feb. 3, 1998, now Pat. No. 6,161,633.

(51) Int. Cl.⁷ .............................................. E21B 17/18
(52) U.S. Cl. ...................................................... 175/320
(58) Field of Search .................... 175/320, 321, 175/323, 414

(56) References Cited

U.S. PATENT DOCUMENTS

| | | | |
|---|---|---|---|
| 1,463,848 A | 8/1923 | Shimin | |
| 1,477,855 A | 12/1923 | Thurston | |
| 1,534,850 A | 4/1925 | Hamilton | |
| 1,637,332 A | 8/1927 | Bronson | |
| 1,943,880 A | 1/1934 | Rea | |
| 2,952,270 A | 9/1960 | Fulton et al. | |
| 3,554,306 A | 1/1971 | Wilburn et al. | |
| 4,043,409 A | * 8/1977 | Walter | 175/323 |
| 4,113,405 A | 9/1978 | Dillinger | |
| 4,585,256 A | * 4/1986 | Rassieur et al. | 285/190 |
| 4,805,705 A | * 2/1989 | Liljebrand et al. | 173/80 |
| 4,852,672 A | 8/1989 | Behrens | |
| 4,895,349 A | 1/1990 | Broom | |
| 4,911,729 A | 3/1990 | Rooker | |
| 5,020,780 A | 6/1991 | Woodings | |
| 5,131,479 A | * 7/1992 | Boulet et al. | 175/73 |
| 5,704,740 A | 1/1998 | Ebenhoch et al. | |
| 6,035,953 A | 3/2000 | Rear | |
| 6,220,373 B1 | 4/2001 | Woodings | |

FOREIGN PATENT DOCUMENTS

| | | |
|---|---|---|
| DE | 1 470 064 | 8/1974 |
| DE | 30 25 890 A1 | 7/1980 |
| DE | 3905106 A1 | 8/1990 |
| EP | 0 383 737 A1 | 6/1990 |
| GB | 13399 | 5/1906 |
| GB | 1 564 473 | 1/1977 |
| GB | 2 120 156 A | 4/1982 |
| WO | 95/29030 | 4/1995 |

* cited by examiner

Primary Examiner—William Neuder
(74) Attorney, Agent, or Firm—Wallenstein Wagner & Rockey Ltd.

(57) ABSTRACT

A rotary drill bit for boring a hole through a solid body is disclosed. The drill bit comprises a collar and a penetrating member. At a proximal end, the collar is attachable to a drill shaft. At a distal end, the collar is attachable to the penetrating member. The penetrating member has a connecting end for attachment to the collar and a cutting end for engaging the solid body. A pilot drill is fixedly attached to the cutting end for initiating contact with the solid body.

7 Claims, 3 Drawing Sheets

METHOD AND APPARATUS FOR BORING THROUGH A SOLID MATERIAL

RELATED APPLICATIONS

This is a continuation-in-part application of U.S. application Ser. No. 09/601,560 for "Method and Apparatus for Drilling Through a Solid Material" filed Aug. 3, 2000 which was a United States national phase filing from PCT/US99/02202 filed on Feb. 2, 1999 which was a continuation-in-part application of U.S. application Ser. No. 09/018,244 (now U.S. Pat. No. 6,161,633) filed on Feb. 3, 1998.

TECHNICAL FIELD

The present invention relates to a method and apparatus for boring through a solid body. More particularly, the invention relates to an improved rotary drill bit for boring holes with increased efficiency through difficult to penetrate materials.

BACKGROUND ART

There are different drill bits for drilling through a variety of solid materials. Many of these drill bits are designed for particular applications. For instance, drill bits have been designed to drill through wood, metal, and concrete. In order to drill through these different materials, designers have varied the material used to produce the drill bits, the shape of the drill bits, and the speed with which the drill bit is operated.

One problem existing with many drill bits is the rate at which they will drill a hole is too slow. When the material to be drilled is difficult to penetrate, the process of boring a hole may take as long as several minutes. It is often important to maximize the efficiency at which a hole can be bored into a given material in order to improve manufacturing productivity. Such is the case in drilling tap holes in metal purifying blast furnaces.

The first step in producing steel sheet which is used in the building and construction industry, the automotive industry, the appliance industry, the electric motor industry, etc., is to produce relatively pure iron from iron ore. This process is carried out within a blast furnace. In order to maximize the productivity of a steelmaking facility, as much pure iron as possible must be produced. Many resources are expended in developing methods and procedures to increase the amount of pure iron which can be produced annually.

In developing these methods and procedures, every manufacturing variable in the blast furnace process is optimized. One of these variables is the rate at which the blast furnace can be tapped to drain molten iron from the furnace. A typical blast furnace is tapped from seven to twelve times per day seven days per week. The typical blast furnace tap hole takes several minutes to drill. In fact, some tap holes take as long as 15 minutes to drill.

The rate at which the tap hole is drilled is adversely affected by drill bit "walking." Walking occurs as the drill bit first meets the material to be drilled, it slides or skids laterally rather than boring into the material. Therefore, drill bit walking prevents the drill operator from initiating the drilling process.

The drilling process is also slowed by drill bit binding. Binding occurs when loosened debris created in the drilling process builds within the hole. The debris accumulates around the drill bit and freezes the drill bit within the hole preventing the drill bit from rotating within the hole.

In order to solve some of these problems, certain drill bits have been designed which have air passages. Pressurized air is forced through the passages toward the drill bit/solid body interface to blow the debris away from the drill bit and prevent binding. However, when the hole to be drilled has a substantial length, as is the case with a blast furnace tap hole, the debris continues to build because it cannot escape the hole.

The present invention is provided to solve these and other problems.

SUMMARY OF THE INVENTION

The present invention is directed to a drill shaft connectable to a drilling apparatus at one end a drill bit at an opposing end for boring a hole through solid materials. The drill shaft of the present invention has interchangeable parts and increases the rate at which a hole can be drilled.

One object of the present invention is to provide a sectional shaft. The shaft includes a drill shaft and an extension shaft. The drill shaft may include an outer sleeve fixedly attached to an end of the shaft. At an opposite end of the shaft, the sleeve is not fixedly attached. The shaft passes through the interior of the sleeve. The sleeve is spaced a distance from the shaft so that the shaft is approximately centered within the sleeve. As pressurized air is introduced through the passage, it passes through the interior of the shaft until the air reaches an outlet between the fixed and free ends of the sleeve. The air then travels down along the shaft through the space between the shaft and the sleeve. The air is then expelled from the space at the free end of the sleeve to blow off debris.

The extension shaft joins the drill shaft with a drilling apparatus. The extension shaft includes a base unit of a heavy wall rod. The base unit includes a first end threaded for connection to the drilling apparatus and a second end threaded for connection to the drill shaft. Anti-lock nuts are located at the first and second ends. The anti-lock nuts prevent the shaft connections from seizing that results from the torque of the drilling apparatus. The anti-lock nuts also protect the threads on the shafts when molten iron emerges from a blast furnace tap hole. A block maintains the integrity of the threaded connections.

Other advantages and aspects of the present invention will become apparent upon reading the following description of the drawings and detailed description of the invention.

DETAILED DESCRIPTION

Figure 1:
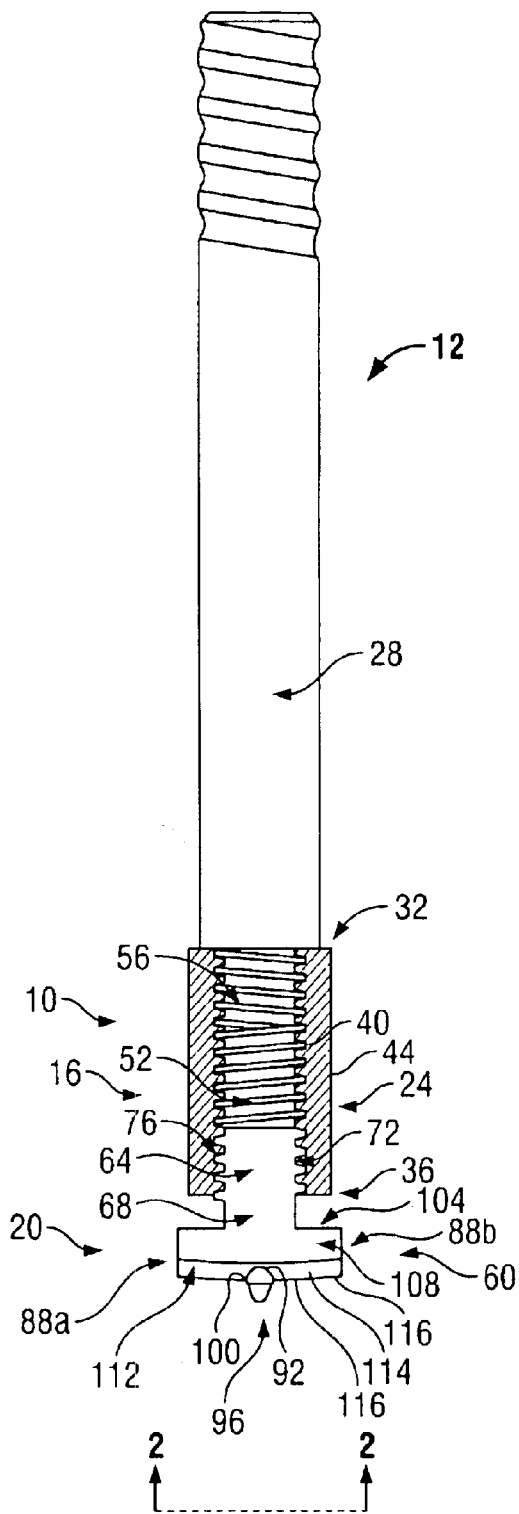
FIG. 1 is a cross-sectional view of a drill bit of the present invention connected to a drill shaft.
Figure 2:
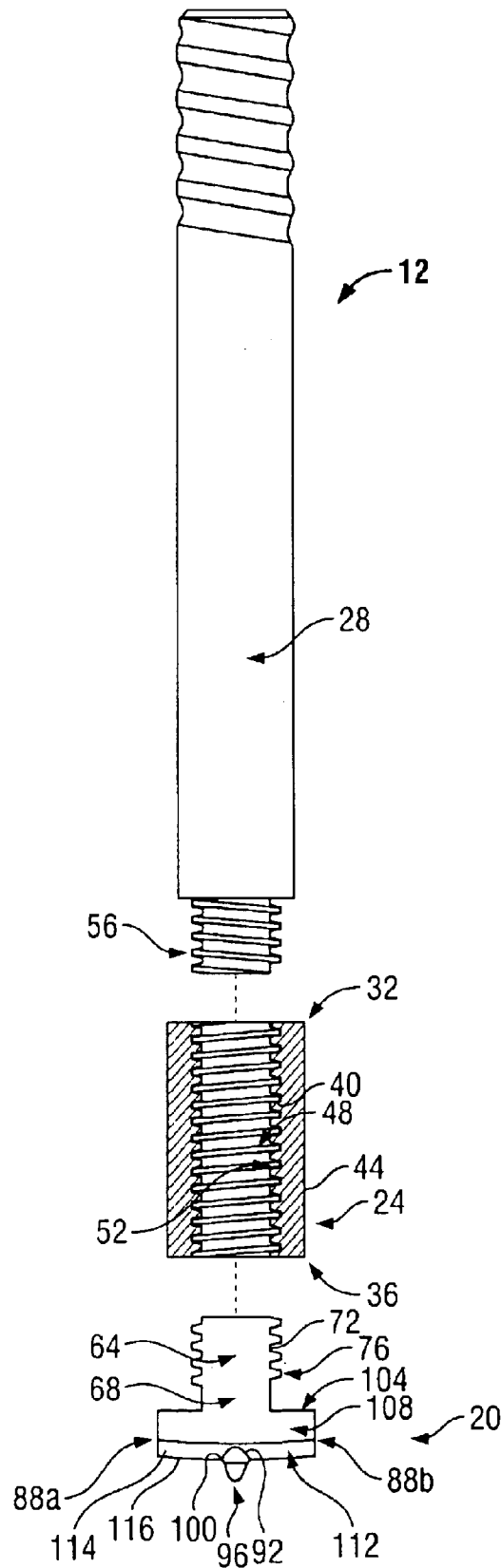
FIG. 2 is an exploded view of the cross-sectional view of FIG. 1.

While the invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a drill bit 10 for boring a hole through a solid body is illustrated. The drill bit 10 of FIG. 1 is shown joined to a shaft 12. The drill bit 10 comprises a collar 16 removably attached to a penetrating member 20. This feature allows the collar 16 or the penetrating member 20 to be switched out depending upon the wear to that part or the type of material to be drilled.

The collar 16 is generally produced from a rigid metallic material. The collar 16 has a cylindrical side wall 24 centered about a longitudinal axis 28, a proximal end 32 and a distal end 36. Alternatively, the collar 16 can be produced with a triangular, square, rectangular, pentagonal, hexagonal, octagonal, or other similarly shaped side wall. The side wall 24 has an inner surface 40 and an outer surface 44. The inner surface 40 defines a chamber 48 for receiving the shaft 12 at the proximal end 32 of the collar 16. The inner surface 40 is furnished with a first set of reverse threads 52. The reverse threads 52 are oriented so that a counterclockwise torque fastens and tightens the collar 16 to a corresponding threaded portion 56 of the shaft 12.

The penetrating member 20 comprises a cutting end 60 and a connecting end 64. The connecting end 64 has opposing planar side walls 68 joined by opposing arcuate side walls 72. The arcuate side walls 72 are furnished with threaded portions 76. These threaded portions 76 also have a reverse orientation so that the connecting end 64 can be joined to the distal end 36 of the collar 16.

Figure 3:
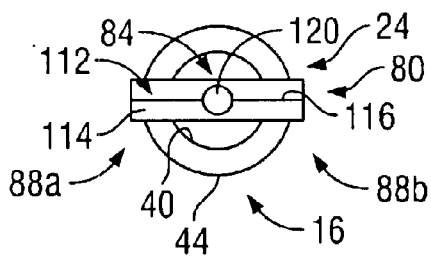
FIG. 3 is a view taken along 2—2 of FIG. 1.

Each arcuate side wall 72 has a length which is less than the length of the planar side walls 68. FIG. 3 shows that this arrangement lends the penetrating member 20 a narrow profile 80. When the penetrating member 20 is inserted into and threadably attached to the collar 16 there are air gaps 84 on either side of the penetrating member 20. The purpose of the air gaps 84 will become clear on further description.

The cutting end 60 is designed to bore through the solid body and is generally suitable for drilling through tough materials such as concrete and/or steel. The cutting end 60 comprises identical first and second spades 88 radiating from a center point 92. A pilot drill 96 is positioned at the center point 92.

The pilot drill 96 is a conical portion centered about the longitudinal axis 28. The pilot drill 96 blends into the remaining portions of the penetrating member 20 forming a smooth transition region 100. The pilot drill 96 is the first portion of the drill bit 10 to contact the solid material which is to be drilled. This pilot drill 96 penetrates the body forming an initial pilot hole and aids in guiding the drill bit 10 through the body. In other words, the pilot drill 96 acts as an anti-walk mechanism because as the pilot drill 96 enters the solid body and forms the pilot hole the remaining portions of the drill bit 10 cannot drift out of position. The anti-walk mechanism increases the rate at which a hole can be drilled because less time is wasted aligning the drill bit with the targeted drill area.

The spades 88 have a pentagonal cross-section. Each spade 88 has a base wall 104, a pair of side walls 108, and a pair of angled walls 112. A portion of each base wall 104 is integrally connected to the connecting end 64 of the penetrating member 20. The pair of opposing side walls 108 extend perpendicularly from the base wall 104. A portion of each side wall 108 is integrally connected and coplanar with the planar side wall of the connecting end 64 so that the penetrating member 20 maintains its narrow profile 80 at the cutting end 60. At an opposite side of the base wall 104, the angled walls 112 extend from each cutting end 60 side wall 108. The angled walls 112 form a beveled cutting surface 114 and extend upwardly and inwardly until the angled walls 112 meet forming a cutting edge 116. Thus, the cutting edge 116 is formed by the union of the pair of angled walls 112. Thus, each spade 88 has a cutting edge 116.

The cutting edges 116 are those portions of the penetrating member 20 that perform the bulk of the drilling. The size of the hole to be bored corresponds roughly to the total length of the cutting edges 116 plus a diameter 120 of the pilot drill 96. Each cutting edge 116 extends outwardly from the center point 92 and tapers downwardly toward the base wall 104. The downwardly tapering cutting edges 116 cooperate with the pilot drill 96 to facilitate movement of the solid material and to prevent the drill bit from walking or shifting along the solid material's surface as the hole is being bored.

The drill bit 10 of the present invention can be employed in conjunction with a solid shaft 12 without having binding occur. Having the cutting edges 116 extend beyond the outer surface 44 of the collar 16 allows debris to be removed from the hole without the use of pressurized air. Therefore, when drilling through a known carcinogenic material, blowing is not needed to avoid drill bit 10 binding. However, the shaft 12 can include a conventional passage 121 to permit pressurized air to be forced through the air gaps 84.

Figure 5:
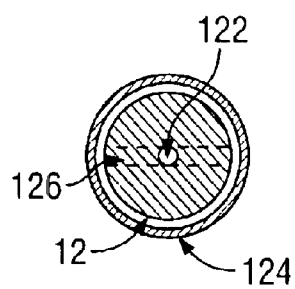
FIG. 5 is a view taken along 3—3 of FIG. 4.
Figure 6:
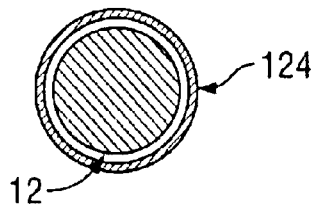
FIG. 6 is a view taken along 4—4 of FIG. 4.
Figure 4:
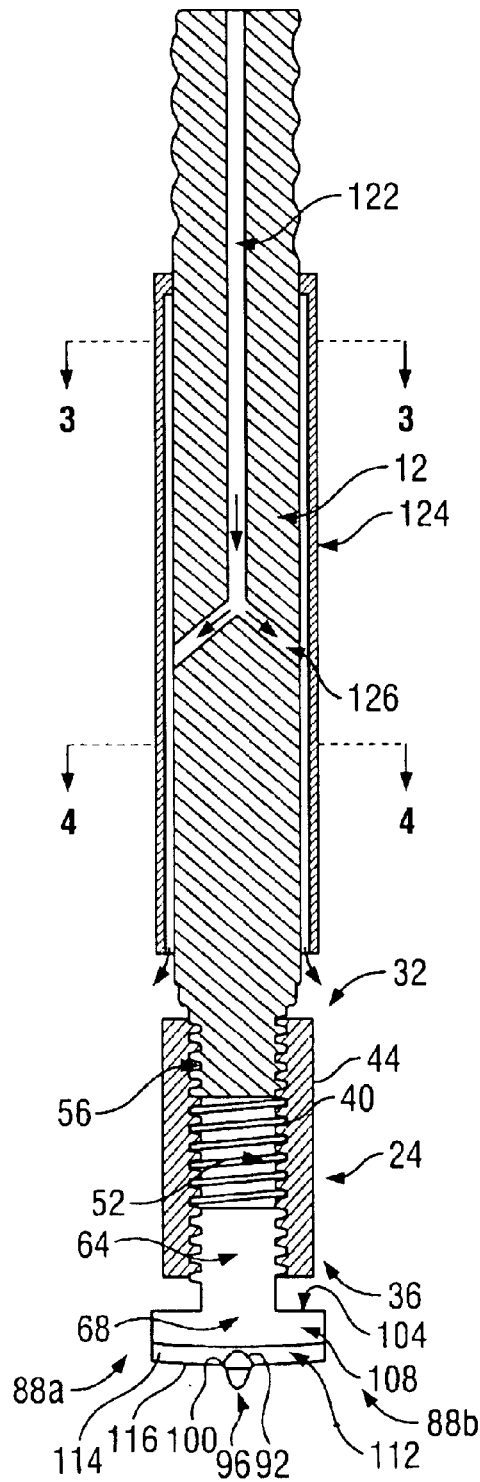
FIG. 4 is a cross-sectional view of a drill bit of the present invention.

In an alternative embodiment shown in FIGS. 4 through 6, pressurized air is forced through a passage 122 which extends partially down the axial length of the shaft 12. The pressurized air is used to blow off loosened debris of the solid body created during the drilling process that, if allowed to build up, could bind the drill bit 10 as the hole is being drilled. Drill bit binding causes delays in the drilling process. Thus, by blowing off the debris and avoiding drill bit binding, the rate at which a hole can be drilled is increased. The pressurized air also acts to cool the drill bit and shaft and further prevents the drill bit and shaft from annealing.

In this embodiment, an outer sleeve 124 is fixedly attached to an end of the shaft 12. At an opposite end of the shaft 12, the sleeve 124 is not fixedly attached. The shaft 12 passes through the interior of the sleeve 124. The sleeve 124 is spaced a distance from the shaft 12 so that the shaft 12 is approximately centered within the sleeve 124. As pressurized air is introduced through the passage 122, it passes through the interior of the shaft 12 until the air reaches an outlet 126 between the fixed and free ends of the sleeve 124. The air then travels down along the shaft 12 through the space between the shaft 12 and the sleeve. The air is then expelled from the space at the free end of the sleeve 12 to blow off debris. This arrangement prevents drill bit binding, and the pressurized air also cools the drill bit as it is boring the hole. This arrangement also reduces the amount of debris that goes airborne during blow off.

The cutting edges 116 extend radially beyond the outer surface 44 of the collar 16. Thus, the circumference of the hole being drilled is greater than the circumference of the collar 16. This structure cooperates with the air gaps 84 on either side of the penetrating member 20 and the pressurized air passed through the passage in the shaft 12 to aid in preventing the drill bit 10 from binding up within the hole. As the pressurized air is forced through the passage and the outlet and along the shaft 12, it is forced out of the free end of the sleeve 124 and blows the debris away as the hole is being drilled. The loosened debris is expelled from the drilling area along the outer surface 44 of the collar 16. The air gaps 84 help circulate the air within the hole being bored.

Figure 7:
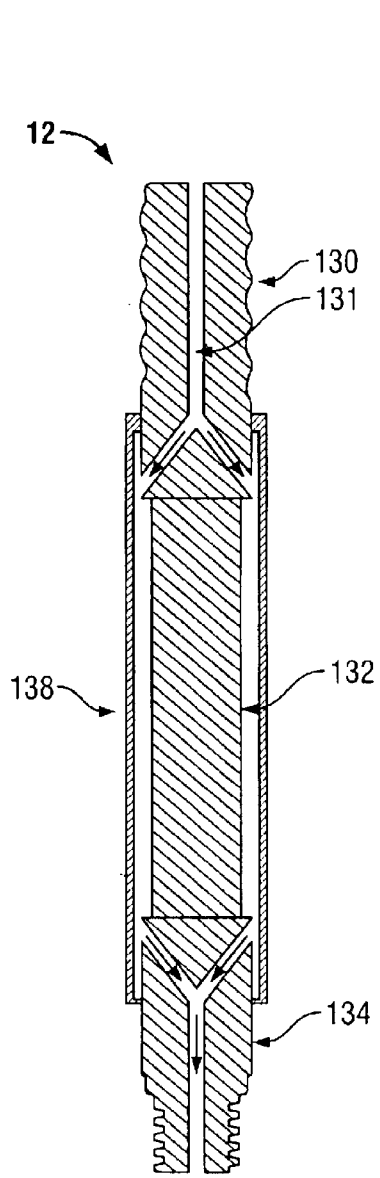
FIG. 7 is a cross-sectional view of an embodiment of the present invention.

FIG. 7 illustrates yet another embodiment. In the embodiment illustrated in FIG. 7, the drill shaft 12 is sectioned into a distal end 130 having a fluid pressure port 131, a solid intermediate section 132, and a proximal end 134 having a fluid pressure vent 136. A partial sleeve 138 surrounds the intermediate section 132 and portions of the distal end 130 and proximal end 134. A disparity in the diameters of the sleeve 138 and the shaft 12 allow the fluid pressure to travel in through the port 131, down the solid intermediate section 132, and out the vent at the distal end 130.

Figure 8:
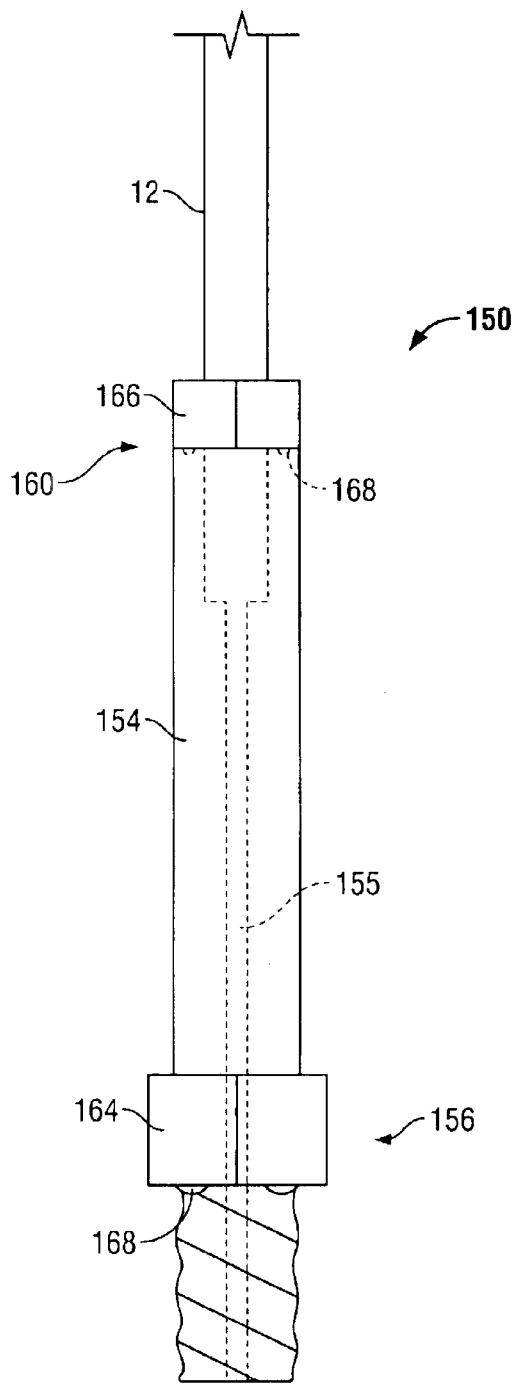
FIG. 8 is a cross-sectional view of a sectional shaft of the present invention.

FIG. 8 illustrates yet another embodiment of the present invention. In this embodiment, an extension shaft 150 joins the drill shaft 12 with a drilling apparatus (not shown). The extension shaft 150 can be provided or used in combination with any of the previously described drill shafts and is generally of a larger diameter than the shaft 12. Accordingly, the extension shaft 150 includes a base unit 154 of a heavy wall rod. The base unit 150 may include a central opening or passage 155 for delivering a fluid pressure to the passage of the shaft 12. The base unit 154 includes a first end 156 threaded, typically rope threaded, for connection to the drilling apparatus and a second end 160 having a receiver housing threaded, typically rope threaded, for connection to the drill shaft 12. In use, anti-lock nuts 164, 166 are located at the first and second ends 156, 160. The anti-lock nuts 164, 166 are produced from a hex-shaped rod stock, and threaded, typically rope threaded, for connection to the drill shaft 12 and the extension shaft 150.

The anti-lock nut 164 located at the first end 156 is generally tack welded to the first end 156. The anti-lock nut 166 located at the second end 160 is typically tack welded to the drill shaft 12. Each of the anti-lock nuts 164, 166 include weld dimples 168 located on their respective bearing surfaces to prohibit wear. When the drill shaft 12 and the extension shaft 150 are joined, the anti-lock nut 166 is generally in engagement with the extension shaft 150. The anti-lock nuts 164, 166 act as bearing members to prevent the shaft connections from seizing that results from the torque of the drilling apparatus by providing a bearing surface. The welded dimples 168 also help to prevent seizing of the parts. The anti-lock nuts 164, 166 also protect the threads on the shafts 12, 150 when molten iron emerges from a blast furnace tap hole. A block maintains the integrity of the threaded connections.

While specific embodiments have been illustrated and described, numerous modifications are possible without departing from the spirit of the invention, and the scope of protection is only limited by the scope of the accompanying claims.

I claim:

1. A drill bit shaft for connection to a drilling apparatus, the drill bit shaft comprising:
    a first shaft member comprising a first elongate rod having a distal end and a proximal end, the proximal end having a threaded portion, the elongate rod further having a passage adapted to transfer a fluid pressure therethrough;
    a second shaft member comprising a second elongate rod having a first end adapted for connection to a drilling apparatus and including a bearing surface for preventing the second shaft member from seizing with the drilling apparatus during use, and a second end having a threaded female receiver adapted for connection to the proximal end of the first shaft, the second elongate rod having a passage therethrough in communication with the passage of the first elongate rod; and
    a bearing member located at the second end of the second shaft member for preventing the first shaft member and the second shaft member from seizing to each other during use.

2. The drill bit shaft of claim 1 wherein the first shaft member further comprises a tubular sleeve axially disposed around the first elongate rod to form a chamber between the first elongate rod and the tubular sleeve, the length of the tubular sleeve being insufficient to overlay the distal and proximal ends of the first elongate rod, a first end of the tubular sleeve adjacent to the proximal end of the first elongate rod being joined to the first elongate rod to seal a first end of the chamber, and an aperture through the at least one side wall under the tubular sleeve and adjacent to the sealed end of the annular chamber, the aperture communicating between the proximal end of the first elongate rod and the chamber, such that a fluid pressure applied at the proximal end of the first elongate rod will pass therefrom and exit through the chamber adjacent to the distal end of the first elongate rod.

3. The drill bit shaft of claim 1 wherein the second shaft member further comprises an anti-lock nut for joining the first shaft member to the second shaft member.

4. The drill bit shaft of claim 1 wherein the bearing member comprises an anti-lock nut.

5. The drill bit shaft of claim 1 wherein the second shaft member has a larger diameter than the first shaft member.

6. A drill bit shaft for connection to a drilling apparatus, the drill bit shaft comprising:
    a first shaft member comprising a first elongated bar having at least one side wall, a first end, and a second end threaded to receive a drill bit, a tubular sleeve axially disposed around the first elongated bar to form a chamber between the first elongated bar and the tubular sleeve, the length of the tubular sleeve being insufficient to overlay the first and second ends of the first elongated bar, a first end of the tubular sleeve adjacent to the first end of the first elongated bar being joined to the first elongated bar to seal a first end of the chamber, and an aperture through the at least one side wall under the tubular sleeve and adjacent to the sealed end of the annular chamber, the aperture communicating between the first end of the first elongated bar and the chamber, such that a fluid pressure applied at the first end of the first elongated bar will pass therefrom and exit through the chamber adjacent to the threaded second end of the first elongated bar; and
    a second shaft member comprising a first end connectable to a drilling apparatus and a second end connected to the first end of the first shaft member, the second shaft having a fluid pressure passage therethrough for delivering the fluid pressure to the first shaft member, and an anti-lock nut for joining the first shaft member to the second shaft member.

7. A rotary drill bit for boring a hole through a solid body, the rotary drill bit comprising:
    a drill bit;
    a drill shaft having a distal end with a port for accepting a fluid pressure from an external source, an intermediate section, and a proximal end with a fluid pressure vent for delivering the fluid pressure to a drill site;
    a sleeve surrounding the intermediate section and portions of the distal end and proximal end wherein a disparity in diameters of the sleeve and the shaft allow the fluid pressure to travel in through the port, down the intermediate section, and exit the vent at the distal end;
    an extension shaft having a first end connectable to a drilling apparatus and a second end connected to the distal end of the drill shaft, the extension shaft having a fluid pressure chamber passing therethrough for delivering the fluid pressure to the drill shaft.

* * * * *